United States Patent [19]

Myers et al.

[11] Patent Number: 5,357,746
[45] Date of Patent: Oct. 25, 1994

[54] SYSTEM FOR RECOVERING WASTE HEAT

[75] Inventors: Gerald A. Myers, Longwood; Peter S. Lee, Oviedo, both of Fla.

[73] Assignee: Westinghouse Electric Corporation, Pittsburgh, Pa.

[21] Appl. No.: 168,490

[22] Filed: Dec. 22, 1993

[51] Int. Cl.$^5$ .......................... F02C 6/18; F02C 7/224
[52] U.S. Cl. ..................... 60/39.182; 60/736
[58] Field of Search .............. 60/39.182, 39.511, 736, 60/39.07, 734

[56] References Cited

U.S. PATENT DOCUMENTS

| | | | |
|---|---|---|---|
| 4,099,374 | 7/1978 | Foster-Pegg | 60/39.182 |
| 4,720,968 | 1/1988 | Knizia | 60/39.182 |
| 4,785,622 | 11/1988 | Plumley et al. | 60/39.182 |
| 4,932,204 | 6/1990 | Pavel et al. | 60/736 |
| 4,961,311 | 10/1990 | Pavel et al. | 60/39.182 |

*Primary Examiner*—Louis J. Casaregola
*Attorney, Agent, or Firm*—G. R. Jarosik

[57] ABSTRACT

An improved system for recovering waste heat from a combustion turbine in a combined cycle power plant of the type that includes at least one combustion turbine and at least one steam turbine includes a first heat recovery system for heating condensate in the steam turbine cycle with heat from the hot exhaust gases from the combustion-type turbine, and a second heat recovery system for heating the fuel that is used in the combustion turbine with heat from the exhaust gases. The second system permits recovery of heat energy that is not recovered by the first system, thereby improving plant efficiency.

13 Claims, 1 Drawing Sheet

SYSTEM FOR RECOVERING WASTE HEAT

BACKGROUND OF THE INVENTION

1. Field of the Invention

This invention relates, in general, to combined cycle power plants of the type that include at least one combustion-type turbine and at least one steam-type turbine. More specifically, this invention relates to an improved system for recovering waste heat from a combustion turbine in such a combined cycle power plant.

2. Description of the Prior Art

It is well known in the field of power generation to provide one or more steam turbines in a plant with one or more combustion-type turbines and to use the waste heat contained in the exhaust of the combustion turbines to generate motive steam for the steam turbines. Plants such as these are typically referred to as "combined cycle power plants."

In a combined cycle-type power plant, spent motive steam from the steam-type turbine is condensed into a liquid condensate in a condenser. The condensate is then pumped through a deaerator and from the deaerator into one or more heat exchangers that transfer heat from the exhaust gases of the combustion-type turbine to the condensate. In the heat exchangers, the waste heat from the combustion turbine exhaust is recovered to heat the condensate back into steam, which is then redirected to the steam-type turbine. Such a system is disclosed in U.S. Pat. No. 4,961,311 to Pavel et al.

Unfortunately, some waste heat from the turbine exhaust remains unrecovered in even the most efficient conventional combined cycle power plants, and is released to the environment. It is generally recognized that any improvements that permit recovery of some of the presently unrecoverable waste heat to increase plant efficiency would be desirable.

SUMMARY OF THE INVENTION

Accordingly, it is an object of the invention to provide an improved system for recovering waste heat from a combustion turbine in a combined cycle power plant that has heretofore been unrecoverable.

In order to achieve the above and other objects of the invention, a combined cycle power plant according to one aspect of the invention includes a combustion-type turbine having a fuel inlet and an outlet for emitting hot gases that are combustion products; a fuel line communicated with the inlet; a steam-type turbine having a steam inlet and a steam outlet; a condenser in communication with the steam outlet for condensing spent steam from the steam-type turbine into a liquid condensate; a first heat recovery system for heating the condensate with heat from the hot gases from the outlet of the combustion-type turbine; and a second heat recovery system for heating fuel in the fuel line with heat from hot gases from the outlet of the combustion-type turbine, so that waste heat from the combustion-type turbine that is not recovered by the first heat recovery system may be recovered by the second heat recovery system, thereby improving plant efficiency.

According to a second aspect of the invention, an improved system for recovering waste heat from a combustion turbine in a combined cycle power plant of the type that includes at least one combustion turbine having a fuel inlet and an outlet for emitting hot gases that are exhaust products; at least one steam turbine having a steam inlet and a steam outlet; and a condenser for condensing spent steam from the steam outlet into condensate and a fuel line that is adapted to be communicated with the inlet of the combustion turbine, the system including a first heat recovery system for heating condensate from the condenser with heat from the hot gases from the outlet of the combustion-type turbine; and a second heat recovery system for heating fuel in the fuel line with heat from the hot gases from the outlet of the combustion-type turbine, whereby waste heat from the combustion-type turbine that is not recovered by the first heat recovery system may be recovered by the second heat recovery system, thereby improving plant efficiency.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
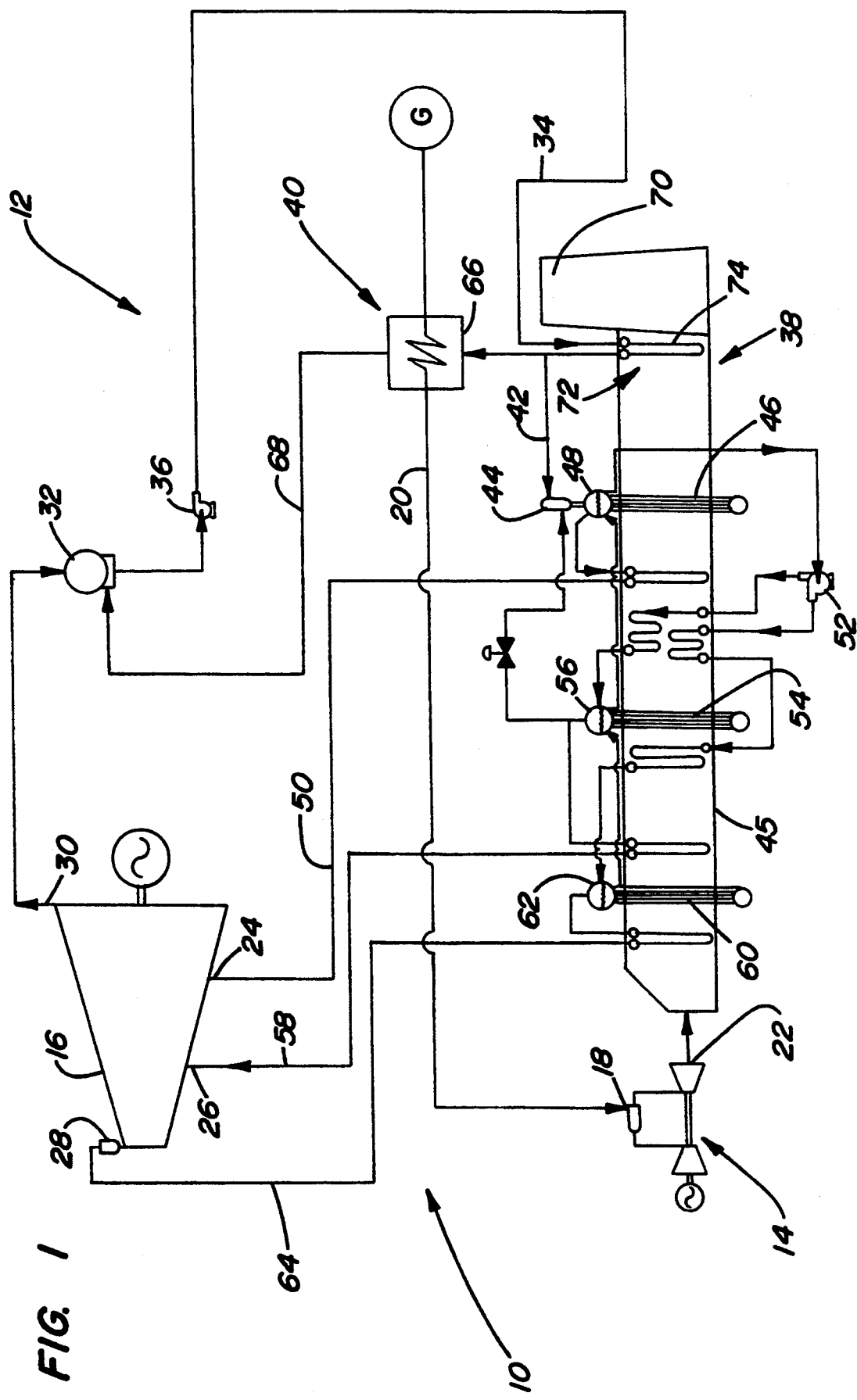
FIG. 1 is a schematic depiction of a combined cycle power plant that is constructed according to a preferred embodiment of the invention.

Referring now to the drawing, a combined cycle power plant 10 according to the preferred embodiment of the invention incorporates an improved system 12 for recovering waste heat from a combustion turbine 14 in combined cycle power plant 10. Combined cycle power plant 10 further includes a steam-type turbine 16 which receives, as will be described in greater detail below, motive steam that is generated by the waste heat from combustion turbine 14.

As is shown in FIG. 1, combustion turbine 14 includes a fuel inlet 18 that is in communication with a fuel line 20. Fuel line 20 is connected to a source G of natural gas, which, in the preferred embodiment, is the fuel that is used to operate combustion turbine 14. Combustion turbine 14 further includes an exhaust outlet 22 from which combustion products such as hot exhaust gases are emitted. Steam-type turbine 16 includes a number of inlets 24, 26, 28 for receiving motive steam that is used to cause turbine 16 to power an electrical generator or the like, as well as an outlet 30 for exhausting the spent motive steam from turbine 16. Outlet 30 is in communication with a condenser 32, which condenses the spent motive steam from turbine 16 into a liquid condensate.

System 12 includes a first heat recovery system 38 for heating condensate from the condenser 32 with heat from the hot gases that are exhausted from the outlet 22 of combustion turbine 14. As may be seen in FIG. 1, first heat recovery system 38 includes a condensate supply line 34 through which condensate from condenser 32 is pumped by a condensate pump 36. A convective tube bank 74 is interposed in condensate supply line 34, for purposes which will be described in greater detail below. First heat recovery system 38 further includes a feed line 42 that feeds condensate from condensate supply line 34 to a deaerator 44. The deaerated condensate from deaerator 44 is then supplied to a heat recovery steam generator (HRSG) 45 that includes a first heat exchanger 46 having a drum 48. First heat exchanger 46 heats the deaerated condensate in drum 48 with heat from exhaust gases of combustion turbine 14. A portion of the deaerated condensate in drum 48 is turned to steam by the recovered heat, and this steam is passed again through the HRSG, and is supplied to the inlet 24 of steam-type turbine 16 by first steam line 50. The liquid in drum 48 is pumped by means of a pump 52 to second and third heat exchangers 54, 60. Second heat exchanger 54 includes a drum 56; the vapor in drum 56 is communicated with the inlet 26 of steam-type turbine 16 by means of second steam line 58. The vapor in drum 62 is communicated with the inlet 28 of steam-type turbine 16 by third steamline 64.

According to one novel aspect of the invention, system 12 further includes a second heat recovery system 40 that includes a heat recovery device 72 that is preferably embodied as a convective tube bank 74, a fuel-condensate heat exchanger 66, and a condensate return line 68. According to this aspect of the invention, condensate from condenser 32 is continuously circulated in a circuit that is defined by the condensate supply line 34, the convective tube bank 74, the fuel-condensate heat exchanger 66 and the condensate return line 68 until it is fed into feed line 42 of the first heat recovery system 38. It will be noted from FIG. 1 that the hot exhaust gases from the outlet 22 of combustion turbine 14 travel in a path from left to right as shown in the diagram, so that second heat recovery system 40 is positioned downstream of the first heat recovery system 38 in the flow path of the hot gases from turbine 14.

Typically, heat recovery in the convective tube bank 74 is limited by the temperature difference between the operating temperature of deaerator 44 and the water outlet temperature of the convective tube bank 74. This temperature difference, about 15 to 25 degrees F., is referred to as "subcooling" and establishes the proper oxygen removal rate, even though the prevailing exhaust hot gas temperatures would allow additional heat recovery.

If it were not for the presence of second heat recovery system 40, heat from the turbine 14 that is not recovered by first heat recovery system 38 would otherwise simply be exhausted to atmosphere through exhaust stack 70. Instead, some of this waste heat is recovered by the convective tube bank 74 by heating the condensate that is in the condensate supply line 34. The heated condensate is then passed through the fuel-condensate heat exchanger 66, where this recovered heat energy is transferred to the fuel in fuel line 20. By heating the fuel in fuel line 20, the efficiency of combustion turbine 14 is increased. Accordingly, the presence of heat recovery system 40 increases the overall efficiency of the combined cycle power plant 10 by increasing the efficiency of combustion turbine 14.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

We claim:

1. A combined cycle power plant, comprising:
    a combustion-type turbine having a fuel inlet and an outlet for emitting hot gases that are combustion products;
    a fuel line communicated with said inlet of said combustion-type turbine;
    a steam-type turbine having a steam inlet and a steam outlet;
    a condenser in communication with said steam outlet for condensing spent steam from said steam type turbine into a liquid condensate;
    a deaerator;
    a pump for supplying condensate from said condenser to said deaerator;
    at least one heat exchanger for heating deaerated condensate from said deaerator with said hot gases;
    a heat recovery device for preheating said condensate before said condensate enters said deaerator; and
    a fuel-condensate heat exchanger for transferring heat from said preheated condensate to fuel that is contained in said fuel line.

2. A combined cycle power plant according to claim 1, wherein said combustion-type turbine is constructed and arranged to operate using fuel gas.

3. A combined cycle power plant according to claim 1, wherein said at least one heat exchanger for heating deaerated condensate from said deaerator with said hot gases comprises three sequential heat exchangers.

4. A combined cycle power plant according to claim 1, wherein said heat exchanger comprises a heat recovery steam generator that is constructed and arranged to generate steam from said deaerated condensate with heat from said hot gases.

5. A combined cycle power plant according to claim 1, wherein said heat recovery device comprises a convective tube bank.

6. A combined cycle power plant according to claim 1, wherein said heat recovery device is positioned downstream from said at least one heat exchanger in a flow path of the hot gases from said combustion-type turbine, whereby it is recovering heat that is not recovered by said first heat recovery means.

7. A combined cycle power plant according to claim 1, further comprising a continuous condensate flow circuit comprising said pump means and said heat recovery device.

8. An improved system for recovering waste heat from a combustion turbine in a combined cycle power plant of the type that includes at least one combustion turbine having a fuel inlet and an outlet for emitting hot gases that are exhaust products; at least one steam turbine having a steam inlet and a steam outlet; and a condenser for condensing spent steam from said steam outlet into condensate, comprising:
    a fuel line that is adapted to be communicated with the inlet of the combustion turbine;
    a deaerator;
    a pump for supplying condensate from said condenser to said deaerator;
    at least one heat exchanger for heating deaerated condensate from said deaerator with said hot gases;
    a heat recovery device for preheating said condensate before said condensate enters said deaerator; and
    a fuel-condensate heat exchanger for transferring heat from said preheated condensate to fuel that is contained in said fuel line.

9. A system according to claim 8, wherein said at least one heat exchanger for heating deaerated condensate from said deaerator with said hot gases comprises three sequential heat exchangers.

10. A system according to claim 8, wherein said at least one heat exchanger comprises a heat recovery steam generator that is constructed and arranged to generate steam from said deaerated condensate with heat from said hot gases.

11. A system according to claim 8, wherein said heat recovery device comprises a convective tube bank.

12. A system according to claim 8, wherein said heat recovery device is positioned downstream from said at least one heat exchanger in a flow path of the hot gases from said combustion-type turbine, whereby it is recovering heat that is not recovered by said first heat recovery means.

13. A system according to claim 8, further comprising a continuous condensate flow circuit comprising said pump means and said heat recovery device.

* * * * *